Jan. 16, 1962  B. A. KAHLE  3,017,150
REVOLVING CHRISTMAS TREE STAND
Filed March 4, 1960  3 Sheets-Sheet 1

INVENTOR.
BRUNO A. KAHLE
BY
Kimmel & Crowell
ATTORNEYS

Jan. 16, 1962    B. A. KAHLE    3,017,150
REVOLVING CHRISTMAS TREE STAND
Filed March 4, 1960    3 Sheets-Sheet 2

INVENTOR.
BRUNO A. KAHLE
BY
Kimmel & Crowell
ATTORNEYS

Jan. 16, 1962 B. A. KAHLE 3,017,150
REVOLVING CHRISTMAS TREE STAND
Filed March 4, 1960 3 Sheets-Sheet 3

INVENTOR.
BRUNO A. KAHLE
BY
Kimmel & Crowell
ATTORNEYS

United States Patent Office 3,017,150
Patented Jan. 16, 1962

3,017,150
REVOLVING CHRISTMAS TREE STAND
Bruno A. Kahle, R.F.D. 1, Box 108, Tomahawk, Wis.
Filed Mar. 4, 1960, Ser. No. 12,849
2 Claims. (Cl. 248—45)

This invention relates to improvements in Christmas tree stands and more particularly to a stand or platform upon which a Christmas tree is mounted in such a manner that it can be made to rotate and exhibit all portions of the periphery of the tree to attractively exhibit its various ornaments and lighting effects. This invention is a continuation in part of my now abandoned copending application for Revolving Christmas Tree Stand bearing Serial No. 735,870 and filed May 16, 1958.

An important object of the invention is to provide a compact Christmas tree stand which includes a tree socket carrying rotor and a motor mounted on said stand to effect rotation of the rotor and its tree carrying socket.

Another object of the invention is to provide a revolving Christmas tree stand where all parts are mounted on a common platform and while permitting the various appliances and elements thereon to be readily disconnected, it can be stored as one intact assembly when not in use.

A further object of the invention is to provide a plurality of supports on a revolving Christmas tree stand and to suspend bells on the supports so that with striking means positioned in the path of rotation of the rotor of the stand, the bells will be struck to create a musical effect as the stand rotates.

A still further object of the invention is to provide a revolving Christmas tree stand having electrical connections associated therewith so that a series of Christmas electric light bulbs that may be strung on a tree supported on the stand may be energized to provide a constant lighting effect as well as a flashing lighting effect.

A still further object of the invention is to provide a revolving Christmas tree stand that has an electrical wiring circuit mounted thereon whereby with a plurality of contacts and collector rings mounted thereon and with spring contact arms operatively engaging the contacts and collector rings, a constant as well as an intermittent source of current is provided that will energize Christmas lights that are placed on a Christmas tree mounted on the stand to give a constant lighting effect and a flashing lighting effect.

With the above and other objects and advantages in view, the invention consists of the novel details of construction, arrangement and combination of parts more fully hereinafter described, claimed and illustrated in the accompanying drawings, in which:

Figure 6:
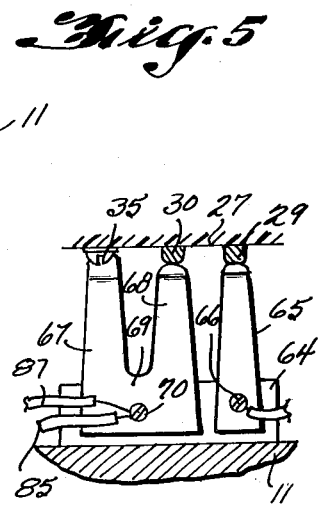
Figure 7:
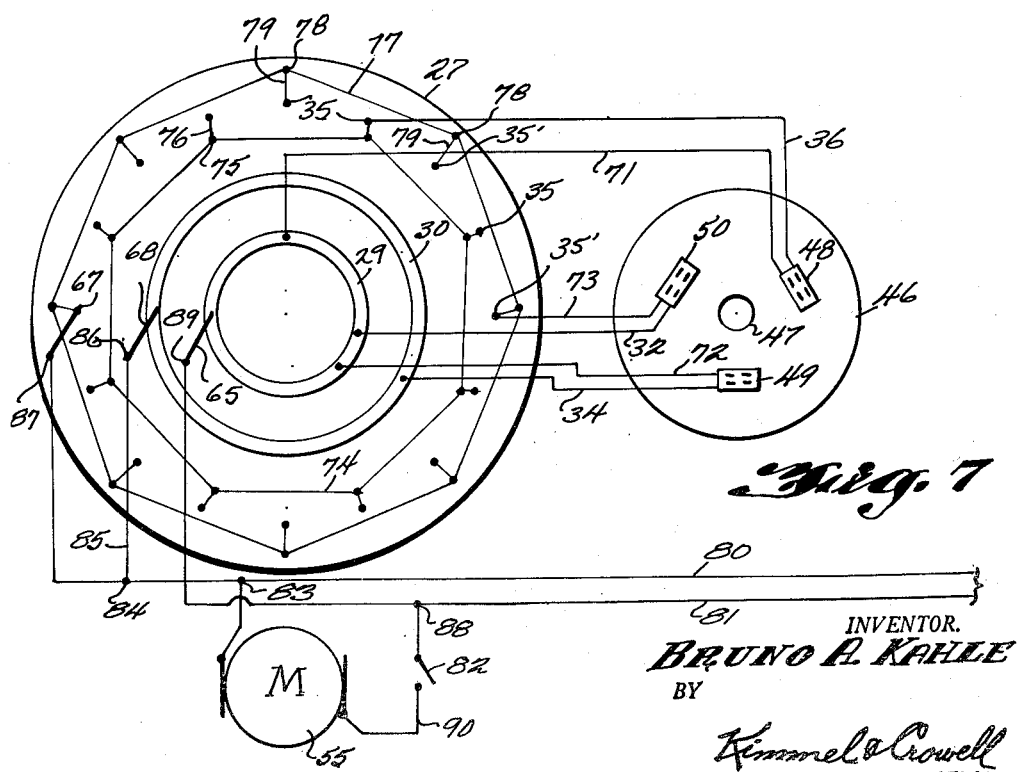

FIG. 6 is an enlarged fragmentary sectional view of the spring contact arms that are disposed in the path of rotation of the collector rings and contacts of the revolving Christmas tree stand; and FIG. 7 is a diagrammatic view of the circuit that is employed by the revolving Christmas tree stand to illuminate Christmas tree lights that are strung on a Christmas tree that is mounted on the revolving Christmas tree stand embodying the invention.

Referring more in detail to the drawings, wherein like parts are designated by like reference numerals, the reference numeral 10 is used to designate a revolving Christmas tree stand embodying the invention.

The revolving Christmas tree stand 10 comprises a square or other shaped stationary platform 11 that is supported by feet 12 that may be made of rubber or some other similar frictional material.

Positioned on the platform 11 in equi-spaced circumjacent relation to the center thereof there is a circular housing 13 and extending outwardly of the outer surface of the housing 13 there are radially disposed projections or bell strikers 14 which operate as will be later described. An attaching ring member 15 is positioned on the upper surface of the platform 11 in abutting relation to the housing 13 and with the ring member secured to the platform and the housing 13 secured to the ring member 15, the housing is retained in fixed relation to the platform 11.

The center of the platform 11 is provided with an opening 16 through which extends a vertically disposed spindle receiving bearing post 17 on the bottom of which is provided a circular flange 18. The flange 18 abuts the undersurface of the platform 11 and is secured thereto by securing elements 19.

The post 17 is provided with a socket 20 which opens through the upper end of the post 17 and extends downwards therefrom for a portion thereof. A ball thrust bearing 21 is positioned in the bottom of the socket 20 and is engaged by the lower end of a spindle 22. The spindle 22 is provided on the upper end thereof with a square-shaped flange 23 which is secured by fasteners 25 to a turntable 27. A reinforcing hub 26 on with the flange 23 and spindle 22 strengthens the unit assembly at this point to prevent the spindle 22 from becoming separated from the flange 23. The turntable 27 is provided with a centrally located circular recess 28.

A pair of collector rings 29 and 30 are positioned on the underside of turntable 27 and the collector ring 29 is secured thereto by securing elements 31 and one of the elements 31 functions as a connector post to which there is connected a conductor 32. The collector ring 30 is secured to the underside of turntable 27 in a similar manner by securing elements 33 and one of the elements 33 has a conductor 34 connected thereto. An annular insulating plate 24 is also mounted on the under side of the turn table 27 and within the cylindrical recess 28 in the latter. Extending through turntable 27 in equi-spaced relation to each other and surrounding to the collector ring 30 there is a circular row of contact members 35 and 35', that are somewhat similar to the elements 31 and 33, and these contact members also extend through the annular insulating plate 24. A conductor 36 is connected to one of the members 35, as will be later described.

Figure 1:
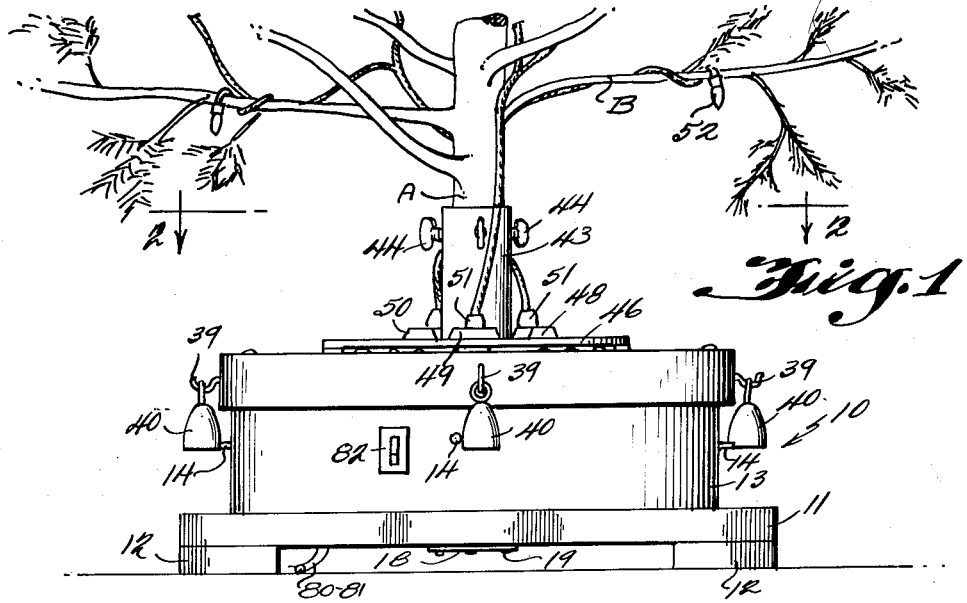
FIG. 1 is a fragmentary side elevational view of a revolving Christmas tree stand embodying the invention.
Figure 2:
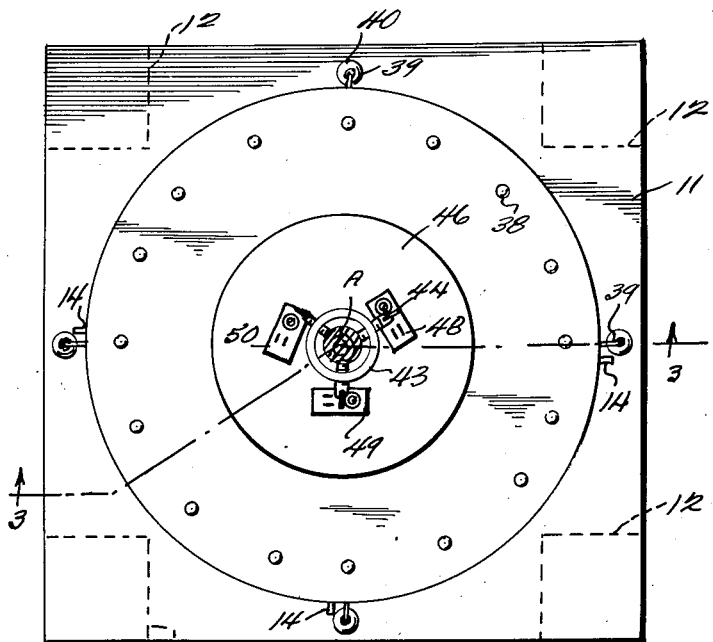
FIG. 2 is a top plan view, partly in section taken on the line 2—2 of FIG. 1.
Figure 3:
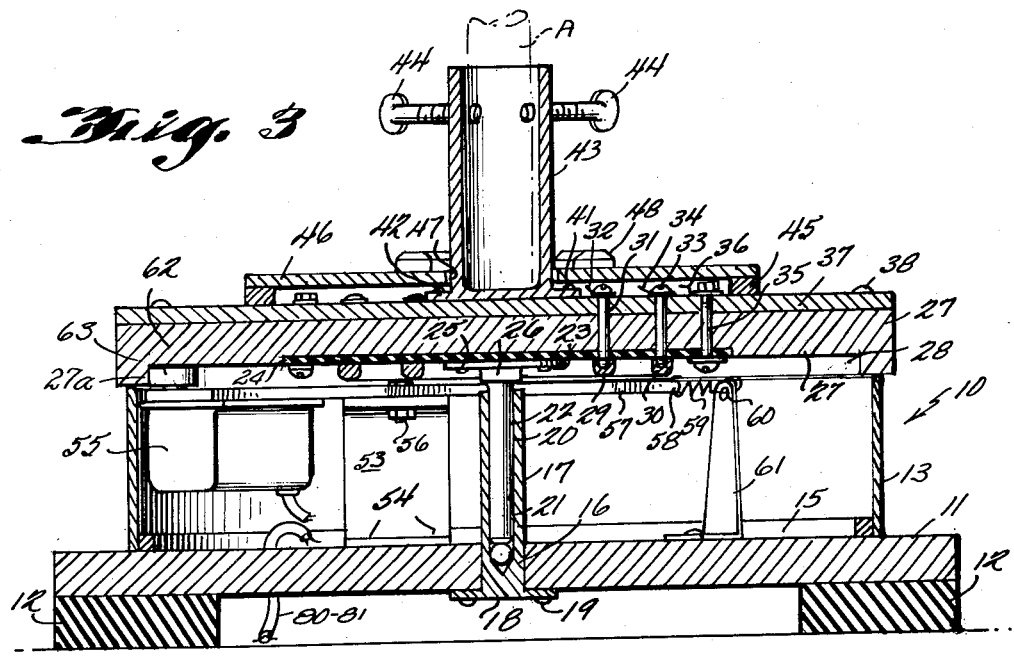
FIG. 3 is a vertical sectional view taken on the line 3—3 of FIG. 2.
Figure 4:
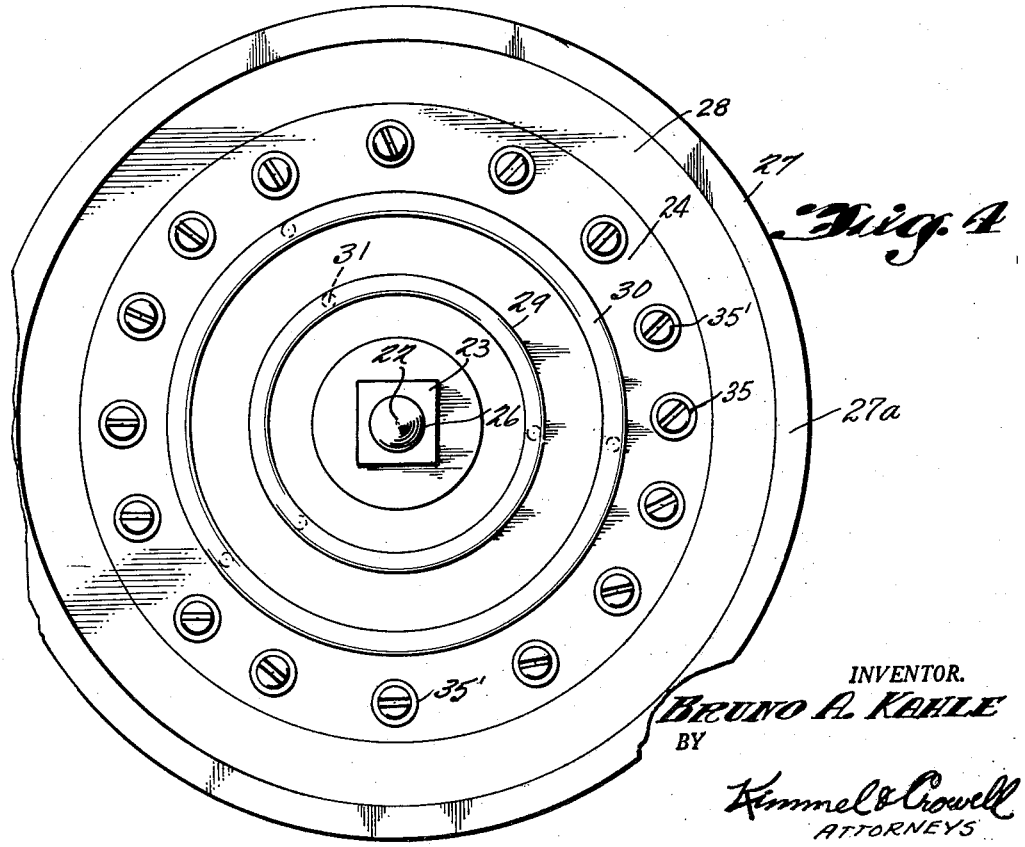
FIG. 4 is a bottom plan view of the rotor or turntable that forms a part of the revolving Christmas tree stand embodying the invention.
Figure 5:
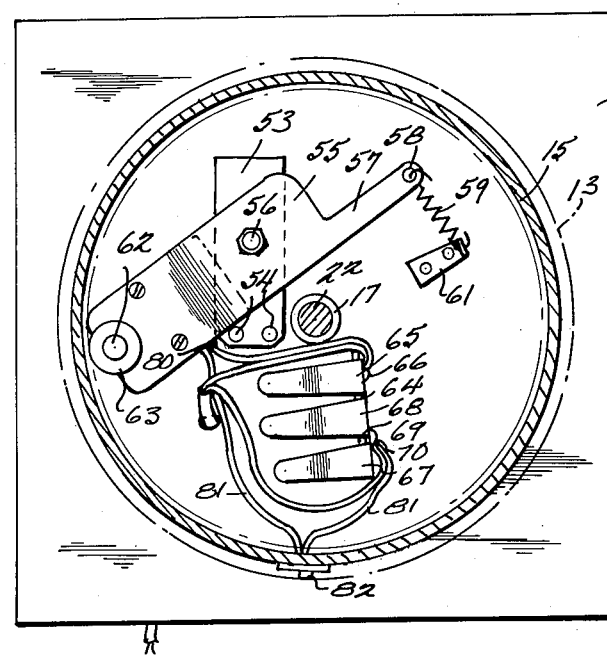
FIG. 5 is a top plan view of the revolving Christmas tree stand with the rotor or turntable of FIG. 4 removed.

Positioned on the upper surface of the turntable 27 there is a decorative and ornamental plate 37 and the elements 31 and 33 and members 35 secure the turntable 27 and plate 37 in fixed unitary relation to each other. Mounted on the upper surface of the plate 37 in spaced relation to the peripheral edge of the plate 37 there is a row of decorative or ornamental members 38 and these members 38 also secure the plate 37 to the turntable 27. It will be noted from FIG. 3 that the diameter of the turntable 27 is slightly greater than the diameter of the housing 13 so that the peripheral edge of the turntable 27 extends outwardly of the outer surface of the housing 13.

Radially disposed supporting hooks 39 are mounted on the peripheral edge of the turntable 27 and bells 40 suspended from the hooks 39 are adapted to be struck by the bell strikers 14 so that musical tones are thus provided during the rotation of the turntable 27.

Secured to the center of the plate 37 by securing elements 41 there is a circular flange 42 of a tree receiving socket 43 into which there is adapted to be placed the end of the trunk A of a Christmas tree B. A plurality of set screw members 44 mounted in the wall of the socket 43 extend inwardly to engage the trunk A to retain the Christmas tree B in fixed relation thereto.

A ring member 45 is mounted on the upper surface of the plate 37 outwardly of the row of contact members 35 and 35' and a disc member 46 is positioned on and secured to the ring member 45, the disc member 46 being provided with a centrally located opening 47 through which the tree socket 43 extends. Positioned on the upper surface of the plate 46 in concentric relation with the tree socket 43 there is a plurality of electrical sockets. Socket 48 is connected to contact members 35 and collector ring 29 by conductors 36 and 71, respectively; socket 49 is connected to collector ring 30 and collector ring 29 by conductors 34 and 72, respectively; and socket 50 is connected to collector ring 29 and contact members 35' by conductors 32 and 73 respectively. The sockets are adapted to selectively receive electric plugs 51 for electric lights 52 that are strung on the tree B in the usual manner.

A mounting bracket 53 is secured to the upper surface of the platform 11 within the shield 13 by securing elements 54 and an electric motor 55 is pivotally mounted at 56 on the bracket 53. The motor 55 has an outwardly extending arm 57 which is provided at its outer end with a lug 58 to which is connected one end of a tension spring 59. The tension spring 59 extends from the lug 58 on the arm 57 to an eye 60 on a vertically disposed bracket 61 that is secured to the upper surface of the platform 11 within the housing 13.

The motor 55 has a vertically positioned armature shaft 62 which has a friction pulley 63 secured to the upper end thereof, and the pulley 63 engages the wall of the recess 28 in the turntable 27 for the rotation thereof. The spring 59 tensions the motor 55 to provide positive frictional contact between the pulley 63 and turntable 27.

A bracket 64 of non-conductive material is mounted on the upper surface of the platform 11 within the shield 13 and a single spring contact arm 65 is secured to the bracket 64 by a securing element 66. The arm 65 has wiping contact with the collector ring 29 as shown in FIG. 6. Also secured to the bracket 64 are double spring contact arms 67 and 68 that are joined by a web 69 through which a securing element 70 extends to secure the web 69 and the arms 67 and 68 thereon to the bracket 64. Spring contact arm 67 has wiping contact with contact members 35 and 35' and spring contact arm 68 has wiping engagement with collector ring 30.

In FIG. 7 there is shown a diagrammatic view of the circuits controlling the energizing of the Christmas tree lights 52 and this figure includes the plate 46 on which the sockets 48, 49 and 50 are mounted, the insulating plate 24 on which the collector rings 29 and 30 and contact members 35 and 35' are mounted. As previously stated, the socket 48 is connected by an electrical wire 36 to one of the contact members 35 and to complete the circuit an electrical wire 71 connects the socket 48 to the collector ring 29. Socket 49, as previously described, is connected to collector ring 30 by an electrical wire 34 and to complete the circuit an electrical wire 72 connects the socket 49 to the collector ring 29. Socket 50, as previously described, is connected to collector ring 29 by an electrical conductor 32 and to complete the circuit an electrical conductor 73 connects the sockets 50 to one of the contact members 35'.

A single electrical conductor 74 is connected to a row of connecting posts 75 and a short electrical conductor 76 connects one of the posts 75 to one of the contact members 35. The contact members 35 are positioned in alternating relationship to the contact members 35'. A single electrical conductor 77 is connected to a circumferential row of connecting posts 78 and a short electrical conductor 79 connects one of the posts 78 to one of the members 35'. The contact members 35 and 35' are positioned in a circumferential row as previously described. The connecting posts 75 are positioned in a circumferential row that is spaced inwardly from and concentrically with respect to the circumferential row of contact members 35 and 35' and each post 75 is in alinement with the contact member 35 to which it is connected. Similarly, the connecting posts 78 are positioned in a circumferential row that is spaced outwardly from and concentrically with respect to the row of contact members 35 and 35' and each post 78 is in alinement with the contact member 35' to which it is connected.

An electric line comprised by conductors 80 and 81 supplies power to the revolving Christmas tree stand 10. The conductor 80 is connected at 83 to one input terminal of the motor 55 and is connected at 84 to a branch conductor 85, which latter is connected at 86 to the spring contact arm 68, which is in wiping engagement with the collector ring 30.

The conductor 80 extends to and is connected at 87 to the spring contact arm 67 that has wiping engagement with the contact members 35 and 35'. The conductor 81 is connected at 89 to the spring contact arm 65 that has wiping engagement with the collector ring 29. It is also connected by a branch conductor 88 to one side of a switch 82. The other side of this switch 82 is connected by a conductor 90 to the other input terminal of the motor 55. Switch 82 controls the operation of the motor 55. This switch 82 is mounted on the housing 13 to provide ready access thereto. It is to be understood that the connections 86 and 87 are used for clarity in describing the circuit in FIG. 7, since in FIG. 6 only one element 70 is used to connect the conductors 85 and 87 to the web 69 of the spring contact arms 67 and 68. The circuits described provide a constant lighting effect to the Christmas tree lights in the socket 49, and by reason of the make and break effect occasioned by the alternate engagement of the spring contact arms 67 and 68 with the contact members 35 and 35', a flashing effect of the Christmas tree lights in the sockets 48 and 50 is produced. Thus, a constant lighting effect and a flashing light effect are provided for the revolving Christmas tree stand.

In use it will be seen that the trunk A of the Christmas tree B is inserted into the socket 43 and the set screws 44 are tightened to retain the trunk A in fixed relation to this socket. The plugs 51 are inserted into the sockets 48, 49 and 50 and the revolving Christmas tree stand is ready for operation.

The switch 82 is operated to "On" position to energize the motor 55 to rotate the turntable 11 and supply current to the electric lights 52 through the spring contact arms 65, 67 and 68, collector rings 29 and 30 and the contact members 35 and 35'. As the turntable 11 rotates by reason of the engagement of the pulley 63 therewith, the Christmas tree B will be rotated and with the Christmas tree lights 52 producing a constant, as well as a flashing effect, a very highly attractive Christmas tree display will be provided. Upon operation of the switch 82 to "Off" position, the motor 55 will be de-energized and the revolving Christmas tree stand will come to rest. Thus, the switch 82 will control the operation of the revolving Christmas tree stand as desired. The lights 52 may be independently controlled in any desired conventional manner.

There has thus been described a highly decorative and attractive assembly that is to be used with Christmas trees, but it is to be understood that it may be used in the display of other articles as desired.

It is believed that from the foregoing description the construction and operation of the invention will be understood by those skilled in the art and it is to be understood that changes in the minor details of construction, arrangement and combination of the various parts may be

Having thus described the invention what is claimed as new and desired to be secured by Letters Patent is:

1. A revolving Christmas tree stand comprising a platform, a bearing post mounted centrally of said platform, said post being formed with a cylindrical bore in the upper end thereof, a ring fixed to said platform concentrically positioned with respect to said post, a cylindrical housing surrounding and secured to said ring, a turntable having a center spindle rotatably mounted in the bore of said post, said turntable overlying said band and being formed with a vertical cylindrical rim on its under side, a tree mount on the upper side of said turn table, plug sockets disposed around the tree mount for receiving electrical lines to the lights on the Christmas tree, an electric motor in the space between said turntable and platform, said motor having a vertical shaft, a friction drive element on the end of said shaft and engaging with said rim, means mounting and biasing said motor and thus said drive element into engagement with said rim concentrically positioned collector rings and a concentrically positioned row of contacts on the underside of said turntable, fastening elements extending through the turn table and holding the collector rings and the row of contacts in place, spring contact arms mounted on the platform and in contact respectively with said collector rings and said row of contacts, a first circuit comprised by a pair of conductors from a source of electrical power supply, a pair of the spring contact arms, the associated collector rings, the fastening elements mounting the collector rings on the turn table, and the conductors from the fastening elements to at least one of said sockets, and a second circuit comprised by one of said pair of conductors to the source of electrical power supply, the associated spring contact arm and the fastening elements mounting the collector ring on the turn table, a branch conductor from the other of the pair of conductors to the source of electrical power supply, a third spring contact arm, the row of contacts, the fastening elements mounting the row of contacts on the turn table, and the conductors from said latter fastening elements to others of said sockets.

2. The apparatus of claim 1 wherein a ring is mounted on the upper side of said turntable concentric with said tree mount, a circular plate having a central opening therein for said tree mount is secured to said ring, and said sockets are mounted in said plate.

References Cited in the file of this patent

UNITED STATES PATENTS

| | | |
|---|---|---|
| 1,276,601 | Whiting | Aug. 20, 1918 |
| 1,987,994 | Doring | Jan. 15, 1935 |
| 2,209,858 | Steiert | July 30, 1940 |
| 2,527,969 | Siebenkittel | Oct. 31, 1950 |
| 2,613,931 | Singer | Oct. 14, 1952 |